(12) United States Patent
Kannari

(10) Patent No.: US 10,664,232 B2
(45) Date of Patent: May 26, 2020

(54) IMAGE FORMING APPARATUS INCLUDING A SOUND OUTPUT DEVICE THAT OUTPUTS A SOUND, METHOD FOR CONTROLLING IMAGE FORMING APPARATUS, PROGRAM FOR CONTROLLING IMAGE FORMING APPARATUS

(71) Applicant: SHARP KABUSHIKI KAISHA, Sakai, Osaka (JP)

(72) Inventor: Takanori Kannari, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/356,406

(22) Filed: Mar. 18, 2019

(65) Prior Publication Data
US 2019/0303098 A1   Oct. 3, 2019

(30) Foreign Application Priority Data

Mar. 28, 2018   (JP) ................................ 2018-061659

(51) Int. Cl.
| | | |
|---|---|---|
| G06F 3/16 | (2006.01) | |
| G06F 3/12 | (2006.01) | |
| H04R 3/00 | (2006.01) | |
| G03G 15/00 | (2006.01) | |

(52) U.S. Cl.
CPC ......... *G06F 3/167* (2013.01); *G03G 15/5016* (2013.01); *G03G 15/6555* (2013.01); *G06F 3/1207* (2013.01); *H04R 3/00* (2013.01)

(58) Field of Classification Search
None
See application file for complete search history.

(56) References Cited

U.S. PATENT DOCUMENTS

| | | | | |
|---|---|---|---|---|
| 5,040,206 A | * | 8/1991 | Tokumasu | ............... H04M 1/00 |
| | | | | 358/400 |
| 2014/0320876 A1 | * | 10/2014 | Ikebata | .............. H04N 1/00278 |
| | | | | 358/1.13 |
| 2014/0320904 A1 | * | 10/2014 | Ikebata | ................... G03G 15/50 |
| | | | | 358/1.15 |
| 2016/0165090 A1 | * | 6/2016 | Matsuzawa | ........ H04N 1/32128 |
| | | | | 358/434 |

FOREIGN PATENT DOCUMENTS

JP   2010-068026 A   3/2010

\* cited by examiner

*Primary Examiner* — Thomas D Lee
(74) *Attorney, Agent, or Firm* — ScienBiziP, P.C.

(57) ABSTRACT

A multifunctional machine as an image forming apparatus according to the present disclosure includes a speaker and can function as an output apparatus for use in a PA system such as an in-house public address system. During a period in which no sound is being outputted from the speaker, the multifunctional machine operates in a normal mode. Meanwhile, during a period in which a sound is being outputted from the speaker, the multifunctional machine operates in a low-speed mode that is lower in speed than the normal mode. This makes it easy to hear a sound that is outputted from the speaker. In a case where a drive mode of a drive controller switches from either of the normal and low-speed modes to the other at a timing during execution of a process according to a certain job, the drive mode switches after completion of the process.

7 Claims, 7 Drawing Sheets

IMAGE FORMING APPARATUS INCLUDING A SOUND OUTPUT DEVICE THAT OUTPUTS A SOUND, METHOD FOR CONTROLLING IMAGE FORMING APPARATUS, PROGRAM FOR CONTROLLING IMAGE FORMING APPARATUS

BACKGROUND

1. Field

The present disclosure relates to image forming apparatuses, methods for controlling an image forming apparatus, and programs for controlling an image forming apparatus and, in particular, to an image forming apparatus including a sound output device that outputs a sound, a method for controlling such an image forming apparatus, and a program for controlling such an image forming apparatus.

2. Description of the Related Art

This type of image forming apparatus may be provided with a sound guidance function that outputs spoken instructions on how to operate the image forming apparatus, a sound warning, and the like. Meanwhile, the image forming apparatus emits a sound of operation in executing a job. It is therefore essential to prevent a sound of the sound guidance function from being buried in this sound of operation, i.e. to make it easy to hear a sound of the sound guidance function. For example, Japanese Unexamined Patent Application Publication No. 2010-68026 discloses a technology with which to, in a case where a sound guidance function is in a state of notification (enabled), execute a job that is less loud in sound of operation in preference to a job that is louder in sound of operation and thereby make it easy to hear a sound of the sound guidance function.

However, with the technology disclosed in Japanese Unexamined Patent Application Publication No. 2010-68026, it is hard to hear a sound of the sound guidance function when a job that is louder in sound of operation is being executed, although it is easy to hear a sound of the sound guidance function when a job that is less loud in sound of operation is being executed. That is, with the technology disclosed in Japanese Unexamined Patent Application Publication No. 2010-68026, it is basically not possible to make it easy to hear a sound of the sound guidance function.

It is desirable to provide an image forming apparatus that can surely make it easy to hear a sound that is outputted by a sound output device, a method for controlling such an image forming apparatus, and a program for controlling such an image forming apparatus.

SUMMARY

According to a first aspect of the disclosure, there is provided an image forming apparatus including: a sound output device that outputs a sound; an image forming device that executes, in accordance with a job, an image forming process of forming an image on an image recording medium; a drive control device that drives a particular driving element in a drive mode that has been set, the particular driving element including the image forming device; and a mode setting device that sets the drive control device to a first mode as the drive mode during a period in which the sound is not outputted by the sound output device and that sets the drive control device to a second mode as the drive mode during a period in which the sound is outputted by the sound output device, the second mode being a mode in which to drive the particular driving element at a lower speed than in the first mode, wherein in a case where the image forming process based on the job is being executed when the mode setting device changes the drive mode to which the drive control device is set from either of the first and second modes to the other, strictly at the timing of the change, the mode setting device changes the drive mode after completion of the image forming process based on the job.

According to a second aspect of the disclosure, there is provided a method for controlling an image forming apparatus including a sound output device that outputs a sound, the method including: causing an image forming device to execute, in accordance with a job, an image forming process of forming an image on an image recording medium; driving a particular driving element in a drive mode that has been set, the particular driving element including the image forming device; and setting a first mode as the drive mode in the driving during a period in which the sound is not outputted by the sound output device and setting a second mode as the drive mode in the driving during a period in which the sound is outputted by the sound output device, the second mode being a mode in which to drive the particular driving element at a lower speed than in the first mode, wherein in a case where the image forming process based on the job is being executed when the drive mode in the driving is changed from either of the first and second modes to the other, strictly at the timing of the change, the setting includes changing the drive mode after completion of the image forming process based on the job.

According to a third aspect of the disclosure, there is provided a program for controlling an image forming apparatus including a sound output device that outputs a sound, the program causing a computer of the image forming apparatus to execute operations including: causing an image forming device to execute, in accordance with a job, an image forming process of forming an image on an image recording medium; driving a particular driving element in a drive mode that has been set, the particular driving element including the image forming device; and setting a first mode as the drive mode in the driving during a period in which the sound is not outputted by the sound output device and setting a second mode as the drive mode in the driving during a period in which the sound is outputted by the sound output device, the second mode being a mode in which to drive the particular driving element at a lower speed than in the first mode, wherein in a case where the image forming process based on the job is being executed when the drive mode in the driving is changed from either of the first and second modes to the other, strictly at the timing of the change, the setting includes changing the drive mode after completion of the image forming process based on the job.

DESCRIPTION OF THE EMBODIMENTS

First Embodiment

Figure 1:
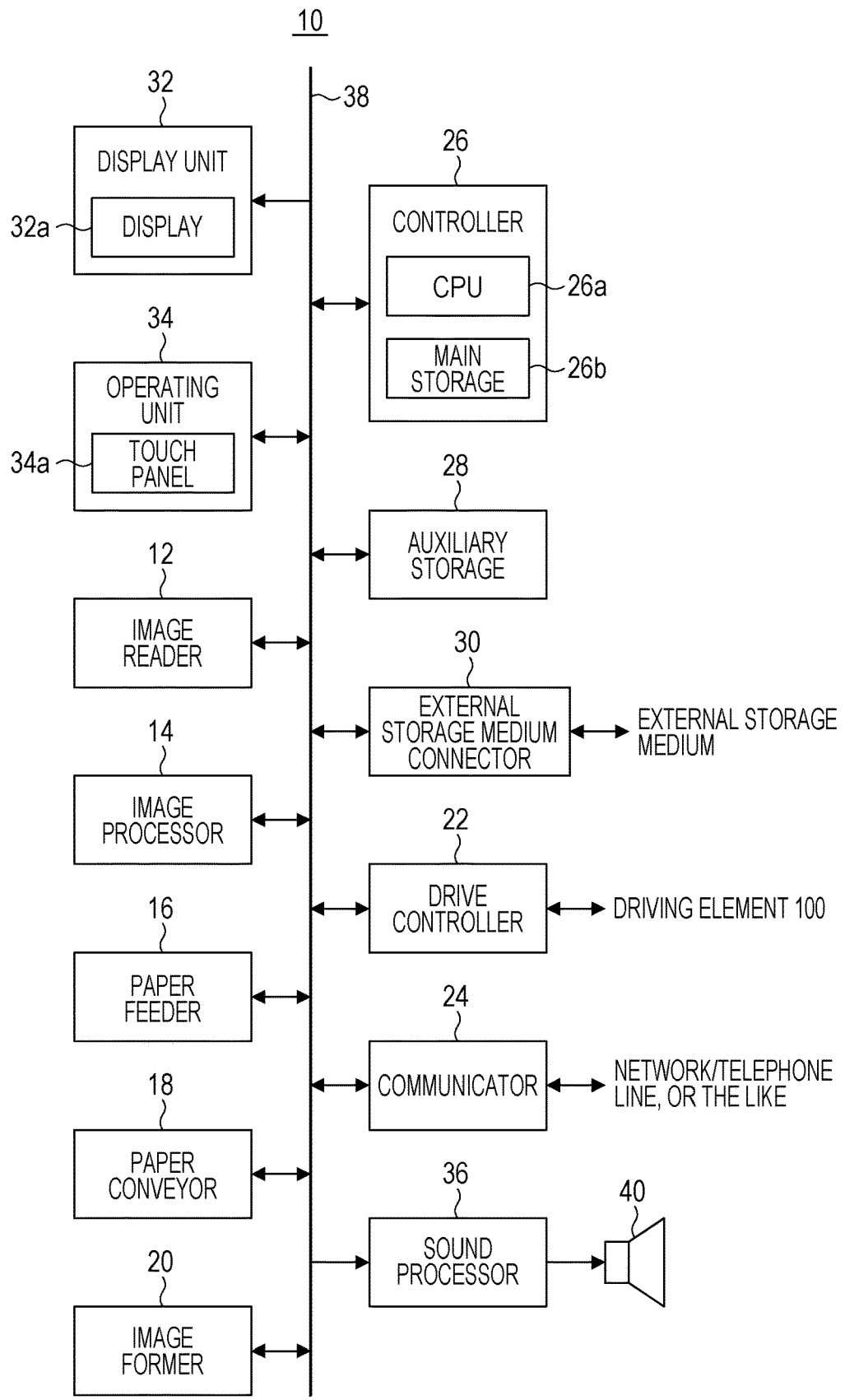
FIG. 1 is a block diagram showing an electrical configuration of a multifunctional machine according to a first embodiment of the present disclosure.

A first embodiment of the present disclosure is described by taking, as an example, a multifunctional machine 10 shown in FIG. 1.

The multifunctional machine 10 according to the first embodiment is an MFP (multifunctional peripheral) including a plurality of functions such as a copy function, a printer function, a scanner function, and a facsimile function. As shown in FIG. 1, the multifunctional machine 10 includes an image reader 12, an image processor, a paper feeder 16, a paper conveyor 18, an image former 20, a drive controller 22, and a communicator 24. The multifunctional machine 10 also includes a controller 26, an auxiliary storage 28, and an external storage medium connector 30. The multifunctional machine 10 further includes a display unit 32 and an operating unit 34. The multifunctional machine 10 additionally includes a sound processor 36. These elements are connected to a common bus 38. Further, a speaker 40 serving as an electroacoustic conversion device is connected to the sound processor 36.

The image reader 12 is an image reading device that is responsible for an image reading process of reading an image of a document (not illustrated) and outputting two-dimensional image data corresponding to the image of the document. For this purpose, the image reader 12 includes a document platen, a light source, a plurality of mirrors, an image-forming lens, a line sensor, and the like (none of which is illustrated). The image reader 12 is used for the realization of the copy function, scanner function, and facsimile (facsimile transmission) function of the multifunctional machine 10. Further, the image reader 12 may include an automatic document feeder (ADF; not illustrated).

The image processor 14 is an image processing device that applies appropriate image processing to various types of image data such as image data that is outputted from the image reader 12. For this purpose, the image processor 14 includes, for example, a DSP (digital signal processor; not illustrated) serving as an image processing execution device. Image data subjected to image processing by the image processor 14 is sent to an appropriate one of the following elements: the image former 20, the communicator 24, the controller 26, the auxiliary storage 28, and the external storage medium connector 30.

The paper feeder 16 includes a paper feed cassette (not illustrated). Moreover, the paper feeder 16 feeds a sheet, e.g. a sheet of paper, accommodated in the paper feed cassette, that serves as an image recording medium to the paper conveyor 18, which will be described next.

The paper conveyer 18 conveys, to the image former 20, a sheet of paper fed from the paper feeder 16 and, furthermore, conveys, to a paper ejector (not illustrated), a sheet of paper subjected to the after-mentioned image forming process by the image former 20. For this purpose, the paper conveyor 18 includes a conveyor path (not illustrated) appropriately extending from the paper feeder 16 to the paper ejector via the image former 20 and a conveyor roller (not illustrated) that conveys a sheet of paper along the conveyor path. Further, the paper conveyor 18 may also include a cyclic conveyor path (not illustrated) for use in duplex printing and a conveyor roller (not illustrated) for use in the cyclic conveyor path.

The image former 20 is an image forming device that is responsible for an image forming process of forming an image, for example, by means of electrophotography on a sheet of paper that is conveyed by the paper conveyor 18. For this purpose, the image former 20 includes a photosensitive drum, a charging device, an exposure device, a developing device, a transfer device, a fixing device, and the like (none of which is illustrated). The image former 20 is used for the realization of the copy function, printer function, and facsimile (facsimile reception) function of the multifunctional machine 10. The image former 20 may be one that performs an image forming process by means of not electrophotography but, for example, ink-jet printing.

Figure 2:
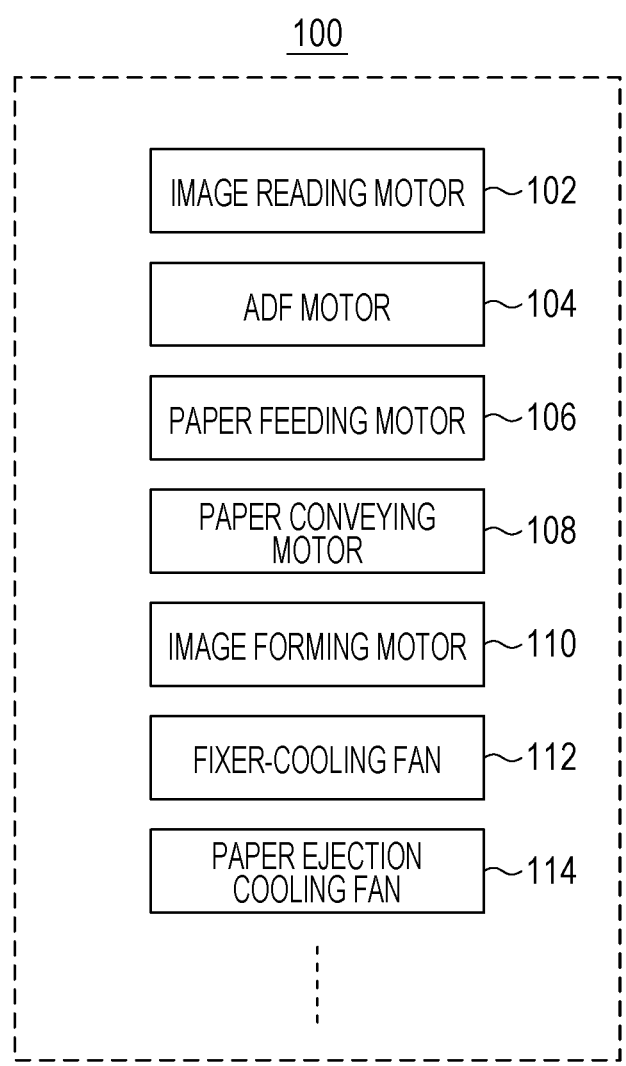
FIG. 2 is a diagram showing an example of a driving element that is driven by a drive controller according to the first embodiment.

The drive controller 22 is a drive control device that drives a driving element 100 that is needed to realize an image reading process that is performed by the image reader 12, the feeding of a sheet of paper by the paper feeder 16, the conveyance of a sheet of paper by the paper conveyor 18, an image forming process that is performed by the image former 20, and the like. As shown in FIG. 2, the term "driving element 100" here encompasses an image reading motor 102, an ADF motor 104, a paper feeding motor 106, a paper conveying motor 108, an image forming motor 110, a fixer-cooling fan 112, a paper ejection cooling fan 114, and the like.

Among these, the image reading motor 102 is provided in the image reader 12 and, in particular, is provided in a drive mechanism (not illustrated) for moving an image reading unit (not illustrated) including the aforementioned line sensor and the like. The ADF motor 104 too is provided in the image reader 12 and, in particular, is provided in the aforementioned automatic document feeder. Moreover, the paper feeding motor 106 is provided in the paper feeder 16 and, in particular, is responsible for driving a pickup roller, a paper feed roller, a separation roller, and the like (none of which is illustrated). The paper conveying motor 108 is provided in the paper conveyor 18 and, in particular, is responsible for driving the aforementioned conveyor roller, a registration roller, a paper ejection roller, and the like (none of which is illustrated). The image forming motor 110 is provided in the image former 20 and, in particular, is responsible for driving the aforementioned photosensitive drum, a transfer roller of the transfer device, a fixing roller of the fixing device, and the like. The fixer-cooling fan 112 too is provided in the image former 20 and, in particular, is responsible for cooling especially the fixing roller of the fixing device. Moreover, the paper ejection cooling fan 114 too is provided in the image former 20 and, in particular, is responsible for cooling a sheet of paper subjected to an image forming process by the image former 20, particularly a sheet of paper subjected to a fixing process by the fixing device. Although not illustrated, the driving element 100 includes a power source cooling fan, various types of sensor, a clutch, and the like in addition to these elements.

With continued reference to FIG. 1, the communicator 24 is a communication device that is responsible for a bidirectional communication process via a network (not illustrated). The term "network" here encompasses the Internet, a LAN (local area network), a VPN (virtual private network), and the like. This network includes not only a wired system but also a radio system. Further, the communicator 24 is also responsible for a bidirectional communication process via a public telephone line (not illustrated). The communicator 24 is used for the realization of the printer function, facsimile function, and image scanner (network scanner) function of the multifunctional machine 10.

Figure 3:
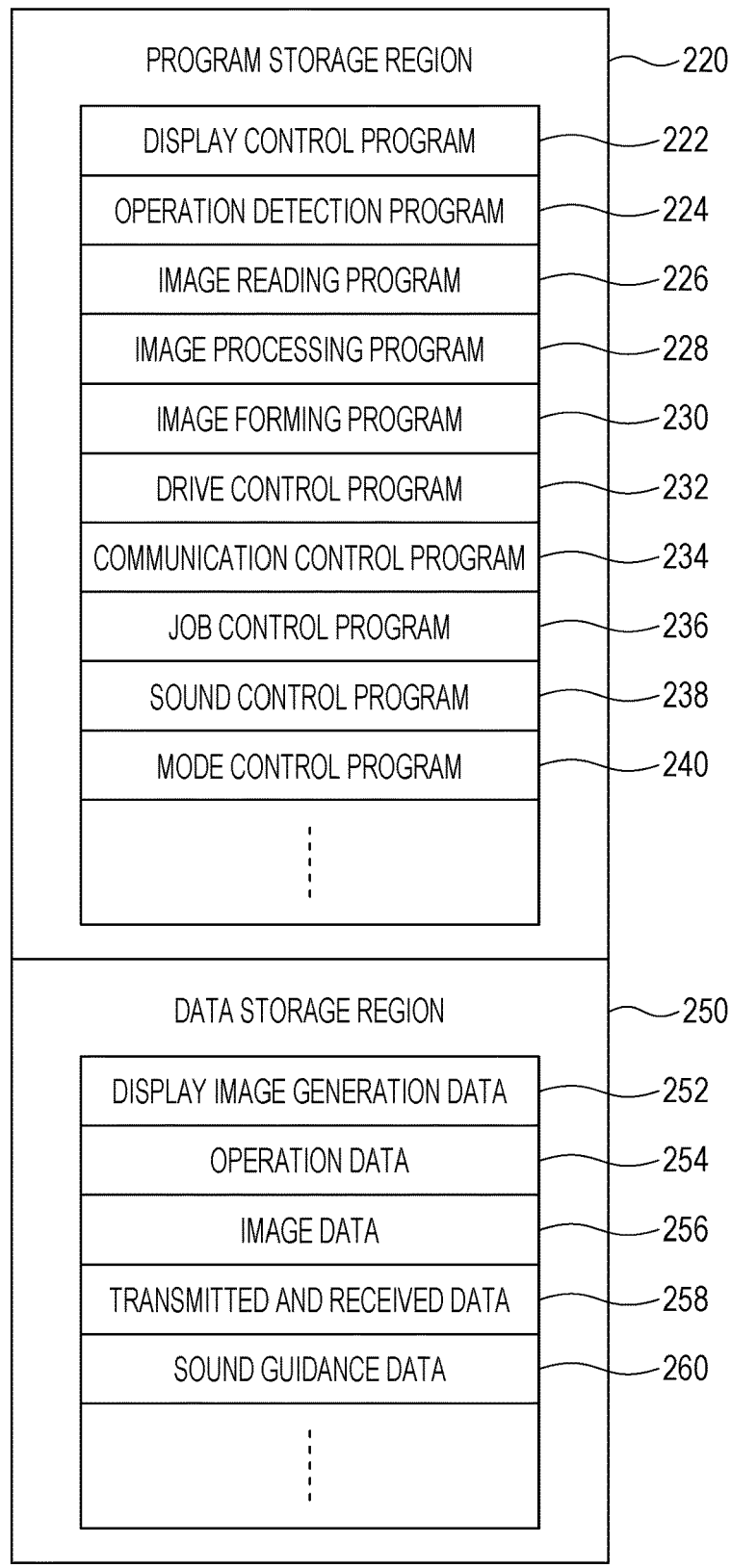
FIG. 3 is a memory map conceptually showing an internal configuration of a RAM of a main storage according to the first embodiment.

The controller 26 is a control device that exercises overall control of the multifunctional machine 10. For this purpose, the controller 26 includes a CPU (central processing unit) 26a serving as a control execution device. The controller 26 also includes a main storage 26b serving as a main storage device that is directly accessible to the CPU 26a. The main storage 26b includes, for example, a ROM (read-only memory; not illustrated) and a RAM (random-access memory; not illustrated). Among these, the ROM has stored therein control programs (firmware) for controlling how the CPU 26a operates. Moreover, the RAM constitutes a working region and a buffer region in which the CPU 26a executes processes based on the control programs. A conceptual internal configuration of the RAM is shown in a memory map 200 of FIG. 3.

As shown in the memory map 200, the RAM has a program storage region 220 and a data storage region 250. Among these, the program storage region 220 has the aforementioned control programs stored therein. Specifically, the control programs include a display control program 222, an operation detection program 224, an image reading program 226, an image processing program 228, an image forming program 230, a drive control program 232, a communication control program 234, a job control program 236, a sound control program 238, a mode control program 240, and the like.

The display control program 222 is a program for generating display screen data that is needed to display various types of screens on a display surface of the after-mentioned display 32a of the display unit 32. The operation detection program 224 is a program for detecting a state of operation on the after-mentioned touch panel 34a of the operating unit 34. The image reading program 226 is a program for controlling the image reader 12. The image processing program 228 is a program for controlling the image processor 14. The image forming program 230 is a program for controlling the image former 20.

Furthermore, the drive control program 232 is a program for controlling the drive controller 22. The communication control program 234 is a program for controlling the communicator 24. The job control program 236 is a program for controlling jobs such as a print job, including the management of the jobs. The sound control program 238 is a program for controlling the sound processor 36. Moreover, the mode control program 240 is a program for causing the CPU 26a to execute the after-mentioned mode control process.

Meanwhile, the data storage region 250 has various types of data stored therein. These various types of data include display image generation data 252, operation data 254, image data 256, transmitted and received data 258, sound guidance data 260, and the like.

The display image generation data 252 is data such as polygon data and texture data that are used in the generation of display screen data based on the aforementioned display control program 222. The operation data 254 is data that represents a state of operation on the touch panel 34a and, in particular, is time-series data that represents the position (coordinates) of a touch on the touch panel 34 by an operator. The image data 256 includes various types of image data such as image data that is outputted from the image reader 12, data that is used for image processing by the image processor 14, and image data that is used an image forming process by the image former 20. Moreover, the transmitted and received data 258 is data that is transmitted and received via the communicator 24. The transmitted and received data 258 includes the after-mentioned broadcast sound data. The sound guidance data 260 is sound source data for use in the after-mentioned sound guidance function.

With further continued reference to FIG. 1, the auxiliary storage 28 is an auxiliary storage device including a hard disk, an NVRAM (non-volatile RAM), and the like (none of which is illustrated). In the auxiliary storage 28, various types of data are stored under control of the CPU 26a. The aforementioned control programs are updated as appropriate, and the control programs thus updated too are stored in the auxiliary storage 28.

The external storage medium connector 30 has a port to which an external storage medium (not illustrated) such as a USB (universal serial bus) is connectable, and exchanges various data with the external storage medium. This makes it possible, for example, to import various types of data stored in the external storage medium into the multifunctional machine 10 and to export various types of data from the multifunctional machine 10 into the external storage medium for storage.

The display unit 32 includes a display 32a serving as a display device. The display 32a constitutes a touch-panel display (touch screen) in combination with the touch panel 34a of the operating unit 34. The display 32a is for example a liquid crystal display (LCD). Alternatively, the display 32a may be an organic electroluminescence (EL) display or the like. Further, in addition to the display 32a, the display unit 32 includes an appropriate light-emitting element (not illustrated) such as a light-emitting diode (LED).

The operating unit 34 includes the touch panel 34a, which serves as an operation receiving device. The touch panel 34 constitutes the aforementioned touch-panel display in combination with the display 32a. For this purpose, the touch panel 34a is provided so as to overlap the display surface of the display 32a. The touch panel 34a is for example a capacitive touch panel. Alternatively, the touch panel 34a may be another type of touch panel such as an electromagnetic induction touch panel, a resistive touch panel, or an infrared touch panel. Further, in addition to the touch panel 34a, the operating unit 34 includes an appropriate hardware switch (not illustrated) such as a press-button switch.

The sound processor 36 is a sound processing device for causing sounds based on the after-mentioned broadcast sound data and the after-mentioned sound guidance data 260 to be outputted from the speaker 40. For that purpose, the sound processor 36 includes a D/A converter circuit (not illustrated) for converting the broadcast sound data and the sound guidance data 260 into analog sound signals, an amplifier circuit (not illustrated) that amplifies the analog sound signals yielded by the D/A converter circuit, and the like. Moreover, the analog sound signals amplified by the amplifier circuit are inputted to the speaker 40. As a result, sounds based on the analog sound signals, i.e. the sounds based on the sound data and the sound guidance data 260, are outputted from the speaker 40.

It is appropriate for the speaker 40, particularly a speaker unit, to be a dynamic speaker. However, instead of being such a dynamic speaker, the speaker 40 may be a capacitor speaker or a ribbon speaker. Further, it is appropriate for a diaphragm of the speaker 40 to be a cone diaphragm. However, instead of being such a cone diaphragm, the diaphragm may be a dome diaphragm or a planar diaphragm.

Incidentally, the multifunctional machine 10 according to the first embodiment includes a function as an output apparatus for use in a PA (public address) system such as an in-house public address system or an internal public address system. In other words, the speaker 40 may be used as a speaker for use in a PA system. In this case, broadcast sound data is received by the communicator 24 via the network from a sound source apparatus (not illustrated). The sound data thus received is stored as the aforementioned transmitted and received data 258 in the RAM of the main storage 26b first and then is inputted to the sound processor 36. As a result, a sound based on the broadcast sound data is outputted from the speaker 40 connected to the sound processor 36. The term "sound" here encompasses not only narrowly-defined sounds of voices that humans produce but also sounds, such as musical sounds and sound effects, that have some sort of information. In other words, the term "sound" here encompasses sounds other than noises.

Further, the multifunctional machine 10 according to the first embodiment includes a sound guidance function that outputs spoken instructions on how to operate the multifunctional machine 10, a sound warning, and the like. Sound source data for use in this sound guidance function is stored in the auxiliary storage 28. Moreover, the sound source data stored in the auxiliary storage 28 is stored as the aforementioned sound guidance data 260 in the main storage 26b first and then is inputted to the sound processor 36. As a result, a sound based on the sound guidance data 260 is outputted from the speaker 40.

Meanwhile, the multifunctional machine 10 emits an operating sound (sound of operation) when it is operating in accordance with a job. Especially, the image former 20, which includes the image forming motor 110, the fixer-cooling fan 112, and the paper ejection cooling fan 114, emits a loud operating sound. Further, the paper feeder 16, which includes the paper feeding motor 106, too emits a loud operating sound. In addition, the paper conveyor 18, which includes the paper conveying motor 108, too emits a loud operating sound. Moreover, the image reader 12, which includes the image reading motor 102, emits a comparable operating sound, although it is not as loud as those which are emitted from the image former 20, the paper feeder 16, and the paper conveyor 18. Further, in a case where the image reader 12 includes an automatic document feeder, the automatic document feeder, which includes the ADF motor 104, too emits a comparable operating sound.

This operating sound that is emitted from the multifunctional machine 10 acts as a noise against a sound that is outputted from the speaker 40. It is therefore essential to prevent a sound that is emitted from the speaker 40 from being buried in this operating sound that is emitted from the multifunctional machine 10, i.e. to make it easy to hear the sound that is emitted from the speaker 40.

Accordingly, in the first embodiment, the multifunctional machine 10 operates at its normal speed during a period in which no sound is being outputted from the speaker 40. Specifically, the drive controller 22, which drives the driving element 100, is set to a drive mode called "normal mode". Moreover, during a period in which a sound is being outputted from the speaker 40, the multifunctional machine 10 operates at a lower speed than the normal speed. Specifically, the drive controller 22 is set to a drive mode called "low-speed mode" in which to drive the driving element 100 at a lower speed than in the normal mode. As a result, at least the image reading motor 102, the ADF motor 104, the paper feeding motor 106, the paper conveying motor 108, the image forming motor 110, the fixer-cooling fan 112, and the paper ejection cooling fan 114, which are shown in FIG. 2, are driven at low speeds. This causes the multifunctional machine 10 to emit a less loud operating sound, making it easy to hear the sound that is outputted from the speaker 40.

The term "period in which a sound is being outputted from the speaker 40" here means, for example in a case where the sound is based on broadcast sound data, a period from a point in time where the inputting of this sound data is started to a point in time where the inputting of the sound data is completed. Therefore, even if there is a little silent period during such a "period in which a sound is being outputted from the speaker 40", this silent period is included in the period in which the sound is being outputted from the speaker 40. Meanwhile, in the case of a sound based on the sound guidance data 260, a series of periods in which the sound based on the sound guidance data 260 is outputted is such a "period in which a sound is being outputted from the speaker 40". Further, the speed at which the diving element 100 is driven in the low-speed mode is for example approximately ⅓ to ½ of the speed at which the driving element 100 is driven in the normal mode.

However, when the drive mode of the drive controller 22 switches from either of the normal and low-speed modes to the other while the multifunctional machine 10 is operating in accordance with a certain job, particularly during execution of an image forming process by the image former 20, the quality of the image forming process may deteriorate. Therefore, in a case where the drive mode of the drive controller 22 switches from either of the normal and low-speed modes to the other at a timing during execution of a process according to a certain job, the drive mode switches after completion of the process. In other words, the drive mode of the drive controller 22 switches at a timing set between the time that a process according to a certain job is executed and the time that a process according to another job is executed. This obviates the particular inconvenience arising from switching between the drive modes of the drive controller 22 and, in particular, prevents deterioration in the quality of an image forming process that is performed by the image former 20.

Figure 4:
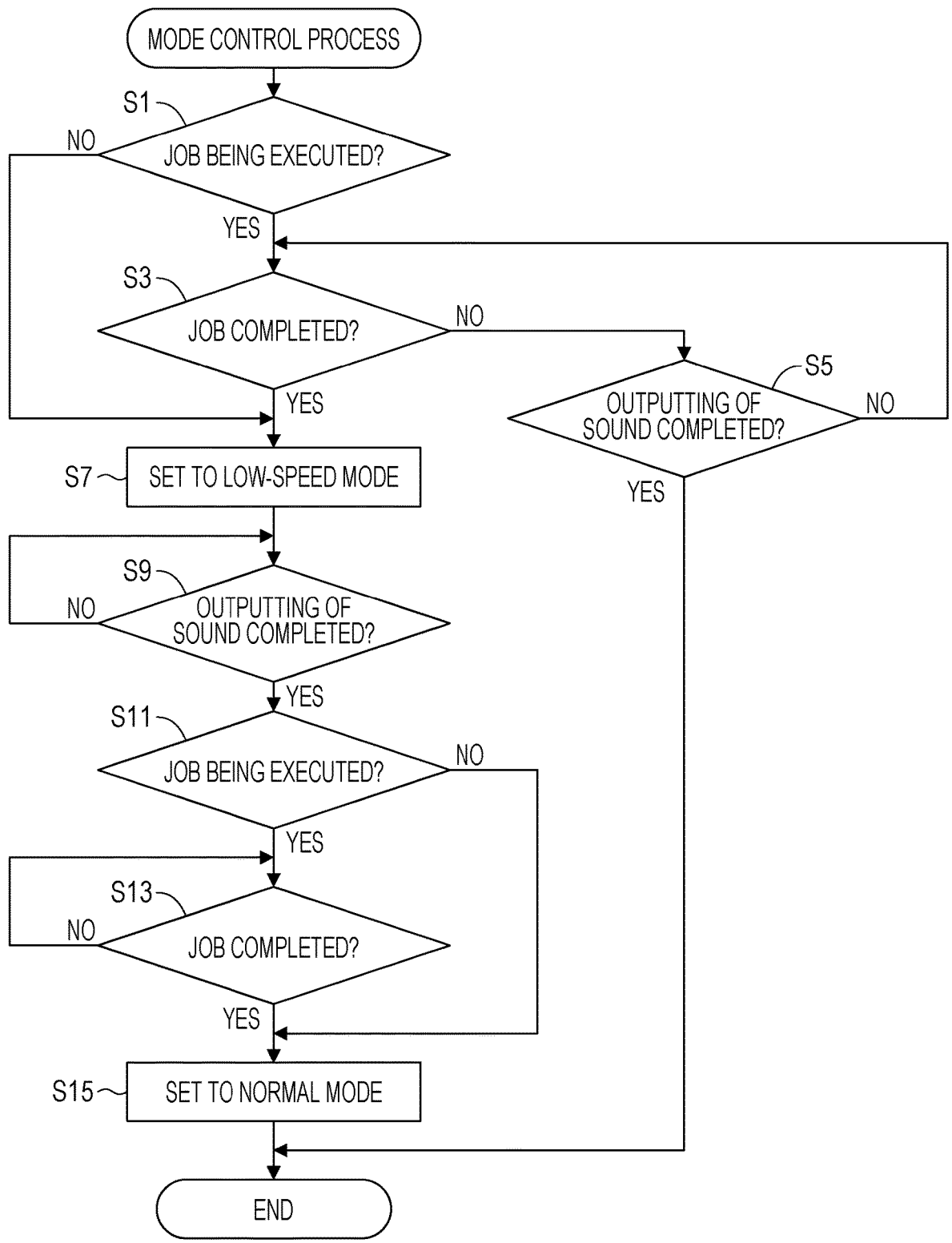
FIG. 4 is a flow chart showing the flow of a mode control process that is executed by a CPU according to the first embodiment.

In order to achieve switching between the drive modes of the drive controller 22 in such a manner, the CPU 26a of the multifunctional machine 10 executes a mode control process in accordance with the aforementioned mode control program 240. The flow of this mode control process is shown in FIG. 4. The CPU 26a executes this mode control process when the outputting of the sound from the speaker 40 is started, strictly when the inputting of the aforementioned broadcast sound data has been started, or when the necessity to output a sound based on the sound guidance data 260 has arisen. Further, the CPU 26a controls the drive controller 22 in accordance with the aforementioned drive control program 232, controls jobs in accordance with the job control program 236, and controls the sound processor 36 in accordance with the sound control program 238; however, a detailed description, including illustrations, of these controls is omitted here.

As shown in FIG. 4, the CPU 26a first determines in step S1 whether a process according to a certain job, such as an image reading process that is performed by the image reader 12 or an image forming process that is performed by the image former 20, is being executed. For example, in a case where the process according to the job is being executed (S1: YES), the CPU 26a proceeds with the process to step S3. On the other hand, in a case where the process according to the job is not being executed (S1: NO), the CPU 26*a* proceeds with the process to step S7, which will be described later.

In step S3, the CPU 26*a* determines whether the process according to the aforementioned job determined in step S1 as being executed has been completed. For example, in a case where the process according to the job has not been completed (S3: NO), the CPU 26*a* proceeds with the process to step S5. On the other hand, in a case where the process according to the job has been completed (S3: YES), the CPU 26*a* proceeds with the process to step S7, which will be described later.

In step S5, the CPU 26*a* determines whether the outputting of the sound from the speaker 40 has been completed. For example, in a case where the outputting of the sound from the speaker 40 has been completed, i.e. in a case where the outputting of the sound from the speaker 40 has been completed before the process according to the aforementioned job is completed (S5: YES), the CPU 26*a* ends this mode control process. On the other hand, in a case where the outputting of the sound from the speaker 40 has not been completed (S5: NO), the CPU 26*a* returns the process to step S3.

In step S7, the CPU 26*a* sets the drive mode of the drive controller 22 as the low-speed mode. From this point forward, the drive controller 22 drives the driving element 100 in the low-speed mode to drive at least the image reading motor 102, the ADF motor 104, the paper feeding motor 106, the paper conveying motor 108, the image forming motor 110, the fixer-cooling fan 112, and the paper ejection cooling fan 114, which are shown in FIG. 2, in the low-speed mode. Then, the CPU 26*a* proceeds with the process to step S9.

In step S9, the CPU 26*a* waits for completion of the outputting of the sound from the speaker 40 (S9: NO). Then, when the outputting of the sound from the speaker 40 is completed (S9: YES), the CPU 26*a* proceeds with the process to step S11.

In step S11, the CPU 26*a* determines whether a process according to a job that is different from the aforementioned job is being executed. For example, in a case where the job according to the different job is being executed (S11: YES), the CPU 26*a* proceeds with the process to step S13. On the other hand, in a case where the job according to the different job is not being executed (S11: NO), the CPU 26*a* proceeds with the process to step S15, which will be described later.

In step S13, the CPU 26*a* waits for completion of the process according to the job determined in step S11 as being executed (S13: NO). Then, when the process according to the job is completed (S13: YES), the CPU 26*a* proceeds with the process to step S15.

In step S15, the CPU 26*a* sets the drive mode of the drive controller 22 as the normal mode. From this point forward, the drive controller 22 drives the driving element 100 in the normal mode. With execution of step S15, the CPU 26*a* ends the mode control process.

Thus, according to the first embodiment, the multifunctional machine 10 operates at its normal speed during a period in which no sound is being outputted from the speaker 40. Moreover, during a period in which a sound is being outputted from the speaker 40, the multifunctional machine 10 operates at a lower speed than the normal speed. This makes it surely easy to hear the sound that is outputted from the speaker 40. Further, the drive mode of the drive controller 22 switches at a timing set between the time that a certain job is executed and the time that another job is executed. This obviates the particular inconvenience arising from switching between the drive modes of the drive controller 22 and, in particular, prevents deterioration in the quality of an image forming process that is performed by the image former 20.

The normal mode according to the first embodiment is an example of a first mode according to the present disclosure, and the low-speed mode according to the first embodiment is an example of a second mode according to the present disclosure. Moreover, the CPU 26*a*, which executes a mode control process in the flow shown in FIG. 4, is an example of a mode setting device according to the present disclosure. Further, of the driving elements 100 shown in FIG. 2, the image reading motor 102, the ADF motor 104, the paper feeding motor 106, the paper conveying motor 108, the image forming motor 110, the fixer-cooling fan 112, and the paper ejection cooling fan 114, which are driven at low speeds when the drive controller 22 has been set to the low-speed mode, are examples of a particular driving element according to the present disclosure. In other words, the image reader 12, the paper feeder 16, the paper conveyor 18, and the image former 20 are examples of the particular driving element according to the present disclosure.

Second Embodiment

Figure 5:
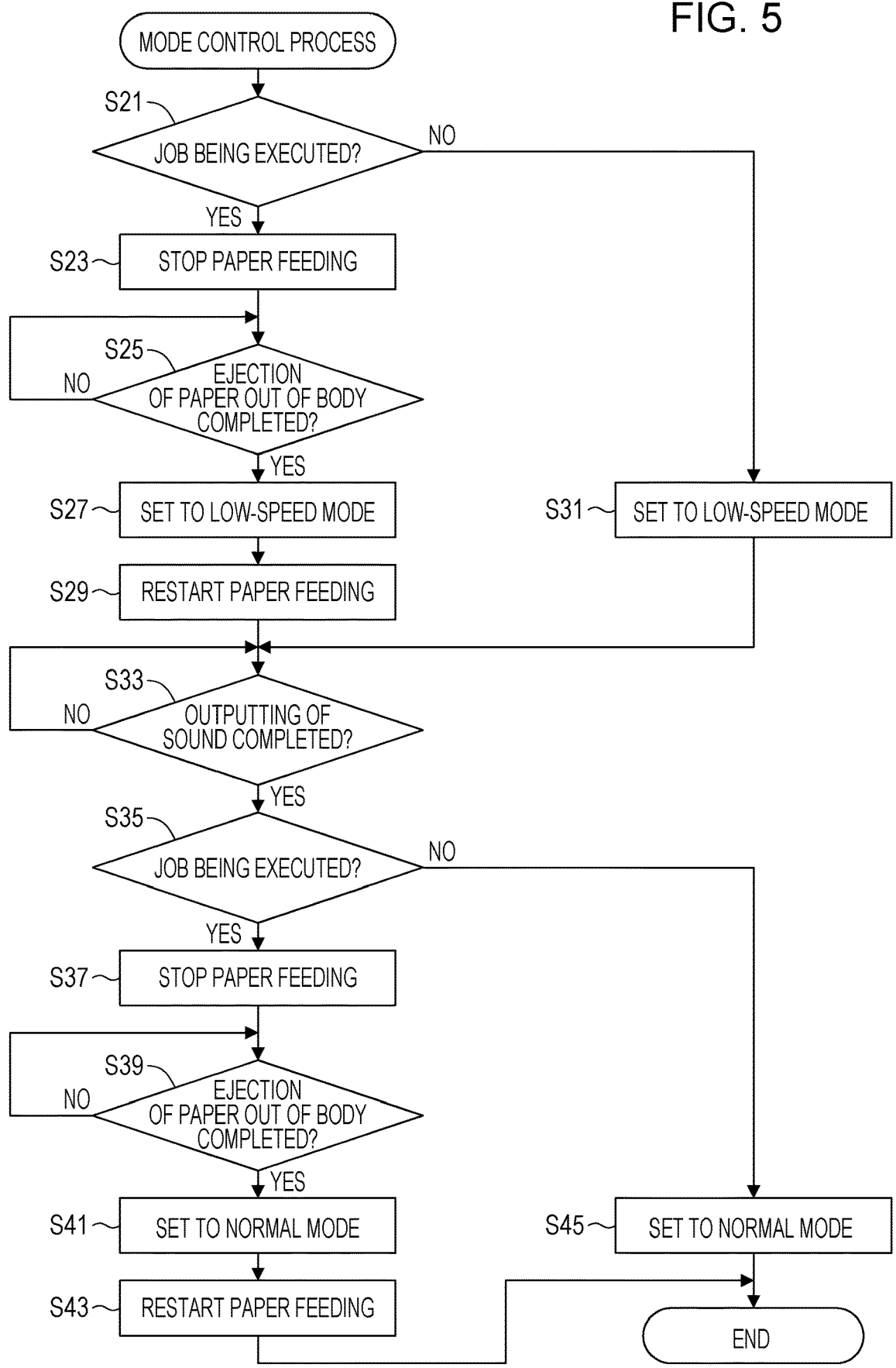
FIG. 5 is a flow chart showing the flow of a mode control process that is executed by a CPU according to a second embodiment of the present disclosure.

Next, a second embodiment of the present disclosure is described with further reference to FIG. 5.

In the second embodiment, the drive mode of the drive controller 22 switches at a timing that is different from that of the first embodiment. Since parts of the second embodiment other than this are the same as those of the first embodiment, the parts which are the same as those of the first embodiment are not described here.

Specifically, in a case where the drive mode of the drive controller 22 switches at a timing during execution of an image forming process by the image former 20, particularly during execution of the image forming process over a plurality of pages, the feeding of sheets of paper to the paper conveyor 18 by the paper feed 16 is temporarily stopped. Moreover, at that point in time, the image former 20 performs an image forming process on all of the sheets of paper being conveyed by the paper conveyor 18. Furthermore, the sheets of paper subjected to the image forming process by the image former 20 are conveyed to the paper ejector and ejected from the paper ejector. Then, the drive mode of the drive controller 22 is switched. Moreover, after the drive mode of the drive controller 22 has switched, the paper feeder 16 restarts the feeding of sheets of paper to the paper conveyor 18; that is, the image former 20 restarts the image forming process.

That is, in the second embodiment, the drive mode of the drive controller 22 switches at a timing set between the time that the image former 20 performs an image forming process on a certain sheet of paper and the time that the image former 20 performs an image forming process on the next sheet of paper. As with the first embodiment, this obviates the particular inconvenience arising from switching between the drive modes of the drive controller 22 and, in particular, prevents deterioration in the quality of an image forming process that is performed by the image former 20.

The flow of a mode control process according to the second embodiment for achieving switching between the drive modes of the drive controller 22 in such a manner is shown in FIG. 5.

As shown in FIG. 5, the CPU 26*a* first determines in step S21 whether the image former 20 is executing an image forming process in accordance with a certain job. For example, in a case where the image former 20 is executing an image forming process (S21: YES), the CPU 26a proceeds with the process to step S23. On the other hand, in a case where the image former 20 is not executing an image forming process (S21: NO), the CPU 26a proceeds with the process to step S31, which will be described later.

In step S23, the CPU 26a stops the feeding of sheets of paper to the paper conveyor 18 by the paper feeder 16. Before stopping the feeding of sheets of paper by the paper feeder 16, the CPU 26a allows the paper conveyor 18 to continue to convey sheets of paper fed to the paper conveyor 18 and allows the image former 20 to execute the image forming process. Then, the CPU 26a proceeds with the process to step S25.

In step S25, the CPU 26a waits for ejection of all of the sheets of paper from the paper conveyor 18 (i.e. out of a body of the multifunctional machine 10) to the aforementioned paper ejector (S25: NO). Then, once all of the sheets of paper are ejected from the paper conveyor 18, the CPU 26a proceeds with the process to step S27.

In step S27, the CPU 26a sets the drive mode of the drive controller 22 as the low-speed mode. From this point forward, the drive controller 22 drives the driving element 100 in the low-speed mode to drive at least the image reading motor 102, the ADF motor 104, the paper feeding motor 106, the paper conveying motor 108, the image forming motor 110, the fixer-cooling fan 112, and the paper ejection cooling fan 114, which are shown in FIG. 2, in the low-speed mode. Then, the CPU 26a proceeds with the process to step S29.

In step S29, the CPU 26a restarts the feeding of sheets of paper to the paper conveyor 18 by the paper feeder 16. Accordingly, the image former 20 restarts the image forming process. Then, the CPU 26a proceeds with the process to step S33.

In a case where the CPU 26a has proceeded with the process from step S21 described above to step S31, i.e. in a case where the image former 20 is not executing an image forming process, the CPU 26a sets the drive mode of the drive controller 22 as the low-speed mode in step S31. Then, the CPU 26a proceeds with the process to step S33.

In step S33, the CPU 26a waits for completion of the outputting of the sound from the speaker 40 (S33: NO). Then, when the outputting of the sound from the speaker 40 is completed (S33: YES), the CPU 26a proceeds with the process to step S35.

In step S35, the CPU 26a determines again whether the image former 20 is executing an image forming process. For example, in a case where the image former 20 is executing an image forming process (S35: YES), the CPU 26a proceeds with the process to step S37. On the other hand, in a case where the image former 20 is not executing an image forming process (S35: NO), the CPU 26a proceeds with the process to step S45, which will be described later.

In step S37, as in step S23 described above, the CPU 26a stops the feeding of sheets of paper to the paper conveyor 18 by the paper feeder 16. Then, the CPU 26a proceeds with the process to step S39.

In step S39, as in step S25 described above, the CPU 26a waits for ejection of all of the sheets of paper from the paper conveyor 18 to the paper ejector (S39: NO). Then, once all of the sheets of paper are ejected from the paper conveyor 18, the CPU 26a proceeds with the process to step S41.

In step S41, the CPU 26a sets the drive mode of the drive controller 22 as the normal mode. From this point forward, the drive controller 22 drives the driving element 100 in the normal mode. Then, the CPU 26a proceeds with the process to step S43.

In step S43, the CPU 26a restarts the feeding of sheets of paper to the paper conveyor 18 by the paper feeder 16. Accordingly, the image former 20 restarts the image forming process. With execution of step S43, the CPU 26a ends the mode control process.

In a case where the CPU 26a has proceeded with the process from step S35 described above to step S45, i.e. in a case where the image former 20 is not executing an image forming process, the CPU 26a sets the drive mode of the drive controller 22 as the normal mode in step S45. With execution of step S45, the CPU 26a ends the mode control process.

Thus, according to the second embodiment, the drive mode of the drive controller 22 switches at a timing set between the time that the image former 20 performs an image forming process on a certain sheet of paper and the time that the image former 20 performs an image forming process on the next sheet of paper. This makes it easier to early hear a sound that is outputted from the speaker 40 than in the first embodiment, in which the drive mode of the drive controller 22 switches at a timing set between the time that a certain job is executed and the time that another job is executed.

The paper feeder 16 according to the second embodiment, strictly the paper feeder 16 and a part of the paper conveyor 18 that extends from the paper feeder 16 to the image former 20, is an example of a medium feed device according to the present disclosure. Moreover, the CPU 26a, which stops the feeding of sheets of paper by the paper feeder 16 in step S27 of FIG. 5, is an example of a feed stop device according to the present disclosure. Further, the CPU 26a, which restarts the feeding of sheets of paper by the paper feeder 16 in step S37 of FIG. 5, is an example of a feed restart device according to the present disclosure.

Third Embodiment

Figure 6:
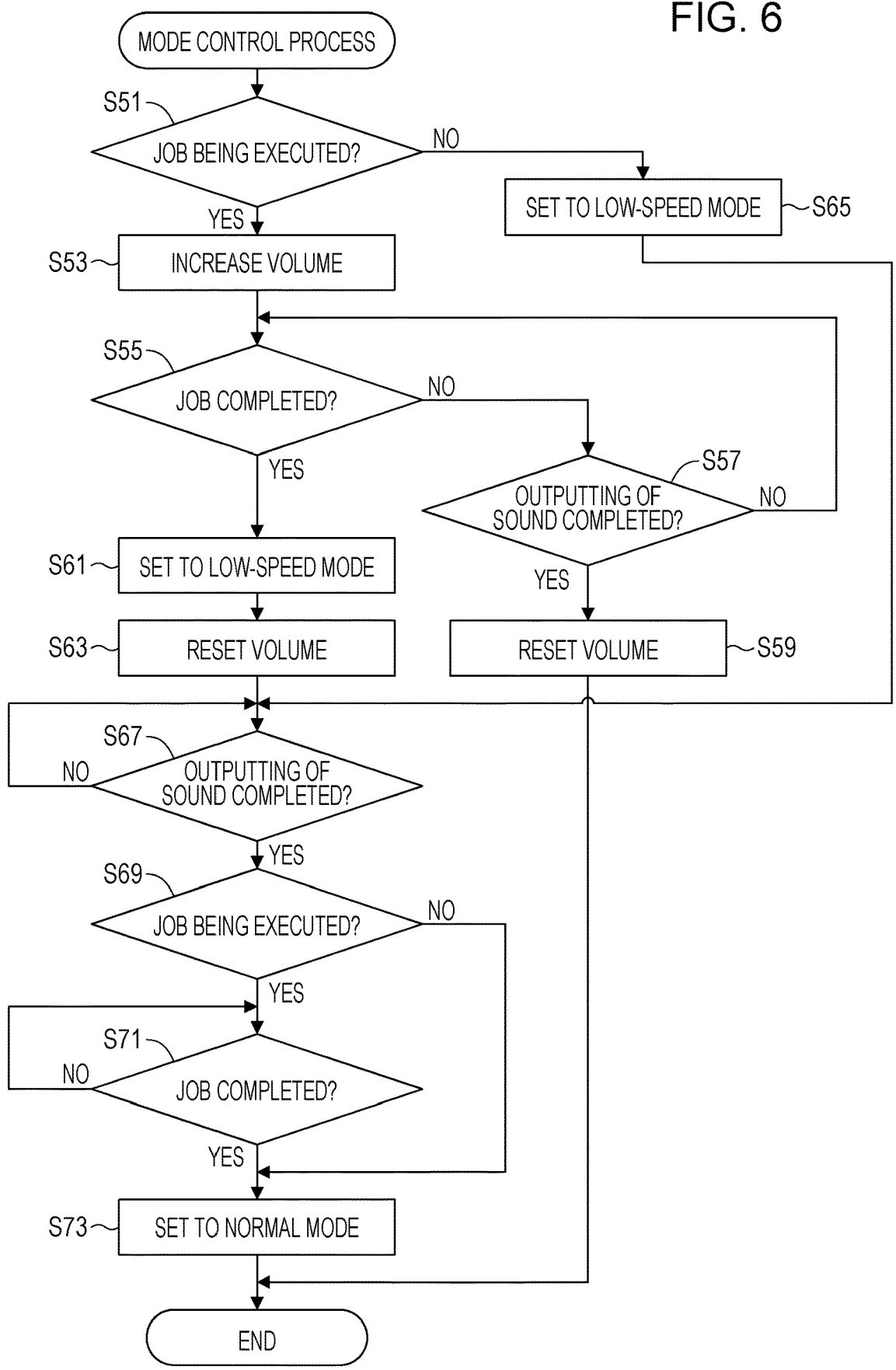
FIG. 6 is a flow chart showing the flow of a mode control process that is executed by a CPU according to a third embodiment of the present disclosure.

Next, a third embodiment of the present disclosure is described with further reference to FIG. 6.

As with the first embodiment, the third embodiment is configured such that the drive mode of the drive controller 22 switches at a timing set between the time that a process according to a certain job is executed and the time that a process according to another job is executed. In addition, the third embodiment is configured such that in a case where a process according to a certain job is being executed when a sound is outputted from the speaker 40, particularly in the beginning of a period in which a sound is outputted from the speaker 40, the volume of sound outputted by the speaker 40 is increased until completion of the process according to the job. This makes it easy to, in a case where a process according to a certain job is being executed when a sound is outputted from the speaker 40, hear the sound that is outputted from the speaker 40. Since parts of the third embodiment other than this are the same as those of the first embodiment, the parts which are the same as those of the first embodiment are not described here.

In the third embodiment, the CPU 26a executes a mode control process in a manner shown in FIG. 6.

That is, as shown in FIG. 6, the CPU 26a first determines in step S51 whether a process according to a certain job is being executed. For example, in a case where the process according to the job is being executed (S51: YES), the CPU 26a proceeds with the process to step S53. On the other hand, in a case where the process according to the job is not being executed (S51: NO), the CPU 26a proceeds with the process to step S65, which will be described later.

In step S53, the CPU 26a increases the volume of sound outputted by the speaker 40 or, in particular, increases the gain of the amplifier circuit of the sound processor 36. Then, the CPU 26a proceeds with the process to step S55. The degree of increase in volume of sound outputted by the speaker 40 in step S53, i.e. the degree of increase in the gain of the amplifier circuit of the sound processor 36, is determined as appropriate according to the loudness of an operating sound that is emitted from the multifunctional machine 10.

In step S55, the CPU 26a determines whether the process according to the aforementioned job determined in step S51 as being executed has been completed. For example, in a case where the process according to the job has not been completed (S53: NO), the CPU 26a proceeds with the process to step S57. On the other hand, in a case where the process according to the job has been completed (S53: YES), the CPU 26a proceeds with the process to step S61, which will be described later.

In step S57, the CPU 26a determines whether the outputting of the sound from the speaker 40 has been completed. For example, in a case where the outputting of the sound from the speaker 40 has been completed, i.e. in a case where the outputting of the sound from the speaker 40 has been completed before the process according to the aforementioned job is completed (S5: YES), the CPU 26a proceeds with the process to step S59. On the other hand, in a case where the outputting of the sound from the speaker 40 has not been completed (S57: NO), the CPU 26a returns the process to step S55.

In step S59, the CPU 26a resets the volume of sound outputted by the speaker 40 to the original volume, which was to be increased in step S53 described above. With execution of step S59, the CPU 26a ends the mode control process.

In step S61, the CPU 26a sets the drive mode of the drive controller 22 as the low-speed mode. From this point forward, the drive controller 22 drives the driving element 100 in the low-speed mode. Then, the CPU 26a proceeds with the process to step S63.

In step S63, the CPU 26a resets the volume of sound outputted by the speaker 40 to the original volume, which was to be increased in step S53 described above. Then, the CPU 26a proceeds with the process to step S67.

In a case where the CPU 26a has proceeded with the process from step S51 described above to step S65, i.e. in a case where a process according to a certain job is not being executed, the CPU 26a sets the drive mode of the drive controller 22 as the low-speed mode in step S65. Then, the CPU 26a proceeds with the process to step S67.

Steps S67 to S73 are identical to steps 9 to 15 of the first embodiment (FIG. 4). Therefore, a detailed description of steps S67 to S73 is omitted.

Thus, according to the third embodiment, in a case where a process according to a certain job is being executed when a sound is outputted from the speaker 40, the volume of sound outputted by the speaker 40 is increased until completion of the process according to the job. This makes it easy to, in a case where a process according to a certain job is being executed when a sound is outputted from the speaker 40, hear the sound that is outputted from the speaker 40.

The CPU 26a, which increases the volume of sound outputted by the speaker 40 in step S53 of FIG. 6 and resets the volume of sound outputted by the speaker 40 to the original volume in step S63 or S59, is an example of a volume increase device according to the present disclosure. Further, after the fashion of the third embodiment, the second embodiment may increase the volume of sound outputted by the speaker 40, for example, until execution of step S27 of FIG. 5.

Fourth Embodiment

Figure 7:
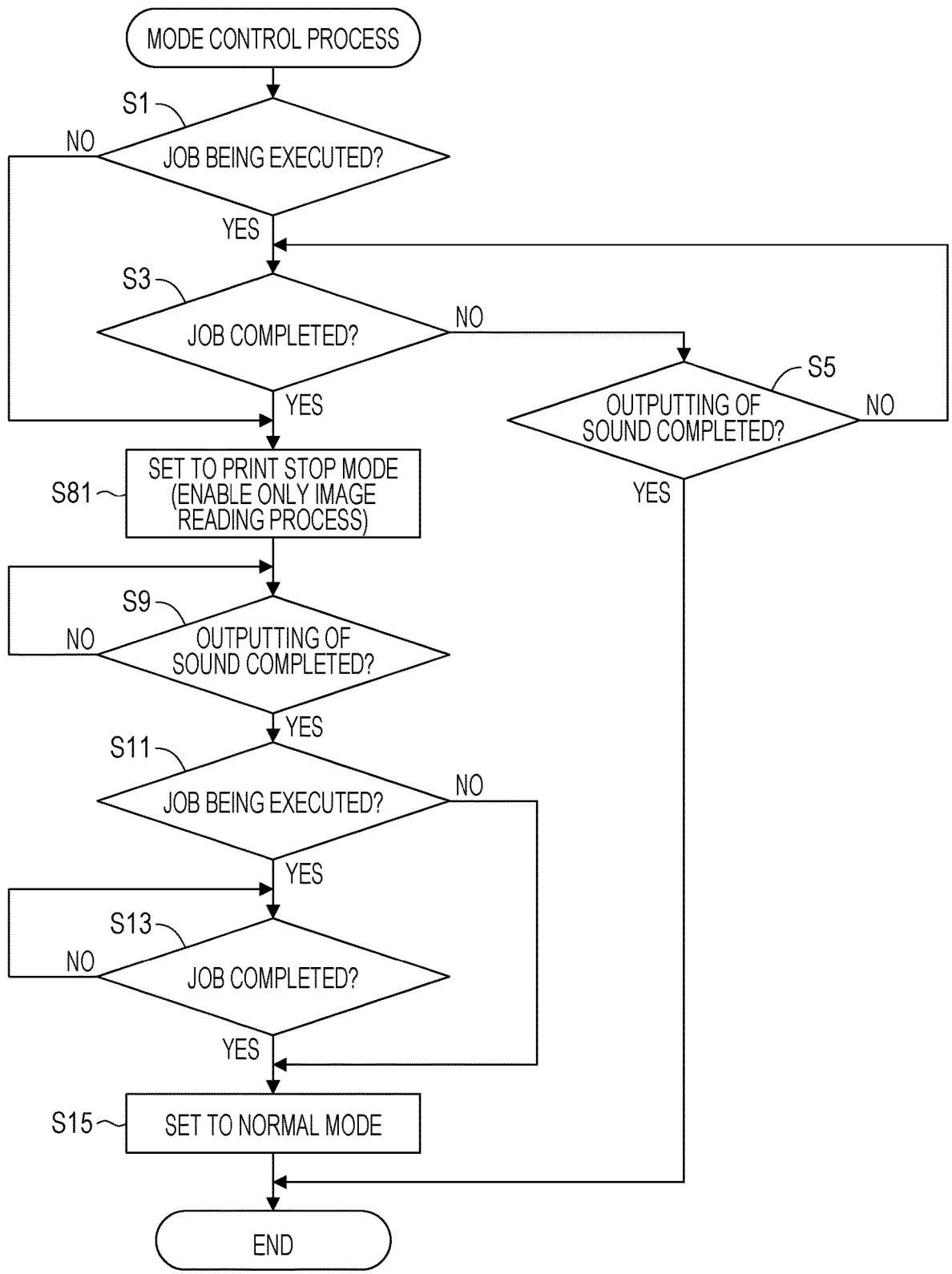
FIG. 7 is a flow chart showing the flow of a mode control process that is executed by a CPU according to a fourth embodiment of the present disclosure.

Next, a fourth embodiment of the present disclosure is described with further reference to FIG. 7.

The fourth embodiment is configured such that in a case where the aforementioned job includes a command to execute an image reading process that is performed by the image reader 12, a print stop mode in which to stop the execution of an image forming process that is performed by the image former 20 is set as the drive mode of the drive controller 22 instead of the aforementioned low-speed mode. Further, when this print stop mode has been set, the feeding of a sheet of paper by the paper feeder 16 and the conveyance of the sheet of paper by the paper conveyor 18 too are stopped. Moreover, the image reading process that is performed by the image reader 12 is executed in accordance with the job. That is, when this print stop mode has been set, only the image forming process that is performed by the image reader 12 is executed, and the image forming process that is performed by the image former 20 is not executed. This print stop mode too makes it easy to hear a sound that is outputted from the speaker 40.

An example of a situation where the print stop mode exerts its effect is a case where the copy function of the multifunctional machine 10 is used. The print stop mode also exerts its effect in a case where the print function and scanner function of the multifunctional machine 10 are used in parallel, a case where the facsimile reception function works at the same time as the scanner function is used, and similar cases. That is, the print stop mode exerts its effect in a situation where an image reading process that is performed by the image reader 12 and an image forming process that is performed by the image former 20 are to be executed at the same time.

In the fourth embodiment, which includes the print stop mode, the CPU 26a executes a mode control process in a manner shown in FIG. 7. The mode control process of FIG. 7 includes step S81 instead of step S7 of the mode control process of the first embodiment (FIG. 4). Therefore, a detailed description of steps other than step S81 is omitted.

As shown in FIG. 7, the CPU 26a sets the drive mode of the drive controller 22 as the print stop mode in step S81. From this point forward, the drive controller 22 allows only the image reader 12 to execute an image reading process and causes the image former 20 to stop executing an image forming process.

The CPU 26a sets the drive mode of the drive controller 22 as the normal mode in step S15. At this point in time, in a case where there is image data that is used for an image forming process that is performed by the image former 20, the CPU 26a allows the image forming process to be executed.

Thus, according to the fourth embodiment, a reduction in operating sound of the multifunctional machine 10 as a whole is achieved by stopping the execution of an image forming process that is performed by the image former 20 and executing only an image reading process that is performed by the image reader 12, which is less loud in operating sound than the image former 20. This too makes it easy to hear a sound that is outputted from the speaker 40.

In the fourth embodiment, the paper feeder 16, the paper conveyor 18, and the image former 20 are examples of a particular driving element according to the present disclosure. Moreover, the print stop mode is an example of a third mode according to the present disclosure. Further, after the fashion of the third embodiment, the second embodiment may include step S which is identical to step S81, for example, instead of steps S27 and S31 of FIG. 5.

OTHER EXAMPLES OF APPLICATION

The embodiments described above are specific examples of the present disclosure and are not intended to limit the technical scope of the present disclosure. The present disclosure is also applicable to aspects other than these embodiments.

For example, although each of the embodiments described above has illustrated a case where the present disclosure is applied to the multifunctional machine 10, this does not imply any limitation. The present disclosure is also applicable to an apparatus such as a printer apparatus other than the multifunctional machine 10.

Further, it is possible to arbitrarily set (select) whether to enable or disable switching between the drive modes of the drive controller 22 in the aforementioned manner.

Further, instead of the aforementioned broadcast sound data, i.e. instead of a digital sound signal, an analog sound signal may be inputted. In this case, the analog sound signal is received from a sound source apparatus of the aforementioned PA system via a speaker line (line).

The present disclosure contains subject matter related to that disclosed in Japanese Priority Patent Application JP 2018-061659 filed in the Japan Patent Office on Mar. 28, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
a sound output device that outputs a sound;
an image forming device that executes, in accordance with a job, an image forming process of forming an image on an image recording medium;
a drive control device that drives a particular driving element in a drive mode that has been set, the particular driving element including the image forming device; and
a mode setting device that sets the drive control device to a first mode as the drive mode during a period in which the sound is not outputted by the sound output device and that sets the drive control device to a second mode as the drive mode during a period in which the sound is outputted by the sound output device, the second mode being a mode in which to drive the particular driving element at a lower speed than in the first mode,
wherein in a case where the image forming process based on the job is being executed, the mode setting device changes the drive mode to which the drive control device is set from either of the first and second modes to the other at a timing set between a time that an image forming process according to a certain job is executed and a time that an image forming process according to another job is executed.

2. The image forming apparatus according to claim 1, further comprising:
a medium feed device that feeds the image recording medium to the image forming device; and
a feed stop device that stops feeding of the image recording medium to the image forming device by the medium feed device in a case where the image forming process based on the job is being executed when the drive mode is changed by the mode setting device,
wherein in a case where the image forming process based on the job is being executed when the mode setting device changes the drive mode, the mode setting device changes the drive mode after completion of the image forming process that is executable after the feeding of the image recording medium to the image forming device has been stopped by the feed stop device,
the image forming apparatus further comprising a feed restart device that restarts the feeding of the image recording medium to the image forming device by the medium feed device after the drive mode has been changed by the mode setting device.

3. The image forming apparatus according to claim 1, further comprising a volume increase device that, in a case where the image forming process based on the job is being executed when the drive mode is changed from the first mode to the second mode by the mode setting device, increases a volume of output of the sound by the sound output device at least until the drive mode is changed from the first mode to the second mode.

4. The image forming apparatus according to claim 1, further comprising an image reading device that executes an image reading process of reading an image of a document,
wherein in a case where the job includes a command to cause the image reading device to execute the image reading process, the mode setting device sets the drive control device to a third mode instead of the second mode during the period in which the sound is outputted by the sound output device, the third mode being a mode in which to stop driving the particular driving element, and
the particular driving element does not include the image forming device.

5. The image forming apparatus according to claim 1, wherein the particular driving element includes at least either a motor or a fan.

6. A method for controlling an image forming apparatus including a sound output device that outputs a sound, the method comprising:
causing an image forming device to execute, in accordance with a job, an image forming process of forming an image on an image recording medium;
driving a particular driving element in a drive mode that has been set, the particular driving element including the image forming device; and
setting a first mode as the drive mode in the driving during a period in which the sound is not outputted by the sound output device and setting a second mode as the drive mode in the driving during a period in which the sound is outputted by the sound output device, the second mode being a mode in which to drive the particular driving element at a lower speed than in the first mode,
wherein in a case where the image forming process based on the job is being executed, the drive mode in the driving is changed from either of the first and second modes to the other at a timing set between a time that an image forming process according to a certain job is executed and a time that an image forming process according to another job is executed.

7. A non-transitory computer-readable storage medium storing a program for controlling an image forming apparatus including a sound output device that outputs a sound, the program causing a computer of the image forming apparatus to execute operations comprising:

causing an image forming device to execute, in accordance with a job, an image forming process of forming an image on an image recording medium;

driving a particular driving element in a drive mode that has been set, the particular driving element including the image forming device; and setting a first mode as the drive mode in the driving during a period in which the sound is not outputted by the sound output device and setting a second mode as the drive mode in the driving during a period in which the sound is outputted by the sound output device, the second mode being a mode in which to drive the particular driving element at a lower speed than in the first mode, wherein in a case where the image forming process based on the job is being executed, the drive mode in the driving is changed from either of the first and second modes to the other at a timing set between a time that an image forming process according to a certain job is executed and a time that an image forming process according to another job is executed.

* * * * *